Figure 1:
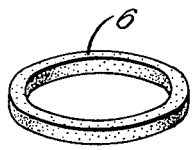

March 8, 1966  L. C. ROBERTSON  3,238,620

METHOD OF PREPARING AN IMPRESSION OF A TOOTH

Filed June 22, 1961

INVENTOR
Lyle C. Robertson
BY Robert M. Dunning
ATTORNEY

3,238,620
METHOD OF PREPARING AN IMPRESSION OF A TOOTH
Lyle C. Robertson, 736 1st Ave. S., South St. Paul, Minn.
Filed June 22, 1961, Ser. No. 118,969
1 Claim. (Cl. 32—17)

This invention relates to an improvement in a method and apparatus for retracting gums designed particularly for use in retracting gingival or gum tissue from the cervical surfaces of the tooth, and is particularly concerned with a dental appliance facilitating the taking of accurate impressions of teeth by providing controlled, uniform retraction of the gum tissue surrounding the neck of the tooth and vaso-constrictive control of capillary bleeding from the gum tissue surrounding the prepared tooth.

The principal object is to provide a dental appliance in the shape of an endless ring of absorbent, resilient material of uniform cross sectional shape by use of which a dental practitioner can retract the gum tissue from the neck of a tooth and control the capillary bleeding from the said gum tissue making possible the taking of accurate impressions of the prepared teeth from which crowns and bridgework may later be constructed.

Much valuable time is lost by the dental practitioner and patient in taking repeated impressions of the prepared tooth or teeth. This necessity for repeated impressions is usually due to the inability of the practitioner to secure accurate impressions of the prepared teeth and gum surfaces. Frequently the source of difficulty is the problem of obtaining uniform retraction of the gum tissue surrounding the tooth. The gum tissue surrounding the neck of a tooth is of a generally resilient nature which causes the gum to resist retraction from the tooth surface. Present materials for the retraction of the gum tissue do not readily cope with the resilient nature of the gum tissue and still provide ease of insertion and uniformity of retraction of the gum tissue. In addition, with present materials there is some difficulty in removing the gum retracting material. It is an object of the present invention to provide a gum retracting dental appliance in the form of an endless ring of uniform cross sectional shape comprising absorbent resilient material. The appliance is inserted between the gum and the cervical portion of the tooth by the dental practitioner using the regular dental instruments, and in such position will provide uniform retraction of the gum tissue surrounding the neck portion of the tooth, and will be easily removed when taking the impression of the tooth with the impression material.

A further object of the present invention resides in the provision of a vaso-constrictive means for control of capillary bleeding from the gum tissue surrounding the prepared tooth. Generally the control or restriction of capillary bleeding is a separate step in the recognized procedure for taking impressions of prepared tooth surfaces. Since the amount of bleeding which will occur varies with the patient, the practitioner at the present time must (prior to taking his impression and following the taking of the impression) restrict and control bleeding by the application of various vaso-constrictors. It is an object of the present invention to provide a dental appliance (in the shape of a ring) of an absorbent resilient material which will snugly engage the neck portion of the tooth when inserted between the tooth and surrounding gum tissue and which may be impregnated with a vaso-constrictor to control or restrict the capillary bleeding from the said gum tissue. It is a feature of the present invention to provide a dental appliance of absorbent material suitable for vaso-constrictive impregnation either in manufacture or as desired by the dental practitioner.

In general, present practice in crown and bridge work technique makes use of cords or string for the retraction material. The cord or string which may be either impregnated with a vaso-constrictor or unimpregnated is unwound from a spool of cord, or withdrawn from a container. The dental practitioner estimates the amount needed and snips that amount off from the spool. He then wraps the cord around the tooth and either ties a knot to hold the cord in position on the cervical portion of the tooth or overlays several turns of the cord on the tooth to hold the cord in place. The practitioner then tucks the cord between the tooth and gum. It thus becomes apparent that the practitioner must resort to estimation as to the length of cord needed, that he must endeavor to tie a knot in the cord material or overlay several turns of cord on the tooth, the cord being relatively thick, which necessarily makes uniform retraction of the gingival tissue extremely difficult. In addition, there is a tendency for the cord material to slide and/or loosen on the tooth surface making it difficult to tuck the cord between the tooth and the gum tissue. It is, therefore, a further object of the present invention to provide a gum retracting dental appliance which will be simple to use, inexpensive to manufacture, and which may be readily stored in sanitary containers, such as envelopes, plastic boxes, and the like.

These and other objects and novel features of the present invention will be more clearly and fully set forth in the following specifications and claim.

Figure 2:
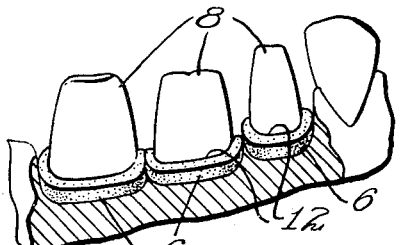
Figure 3:
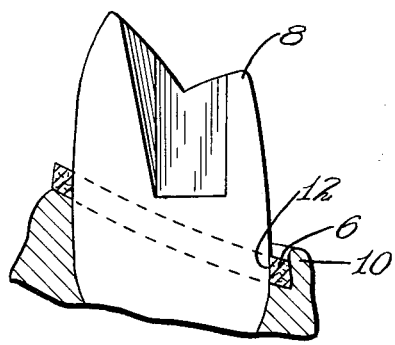
Figure 4:
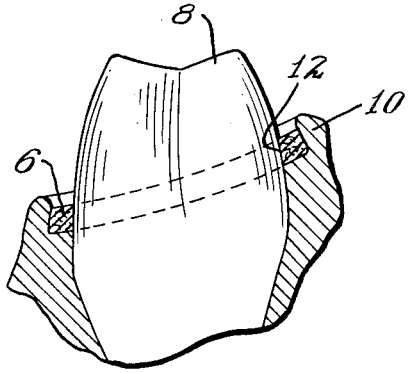
Figure 5:
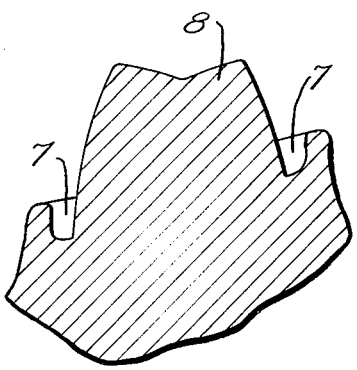

In the drawings forming a part of the specification:
FIGURE 1 is a perspective view of the appliance illustrating the preferred shape.
FIGURE 2 is a front perspective view of the invention in use on teeth of various sizes and shapes, a portion of the gum tissue being broken away to disclose the retracting rings.
FIGURE 3 is a cross sectional view of the appliance in use on a prepared tooth.
FIGURE 4 is a cross sectional view of the appliance in use on a prepared tooth.
FIGURE 5 is a sectional view of a cast of a prepared tooth of FIGURE 4.

With reference first to the drawing shown in FIGURE 1, the drawing illustrates a gum retracting dental appliance in the form of a circular ring which is manufacturable in various diameters and thicknesses. In the preferred composition, the gum retracting means is composed of absorbent, resilient materials which will retain their pliancy in use, such as hard and soft leathers.

The gum retracting dental appliance, as shown in FIGURE 1, appropriates in the device the selective inclusion during manufacture of a vaso-constrictive component for the control and restriction of capillary bleeding of the gum tissue.

As is illustrated in FIGURE 2, the gum retracting dental appliance in the preferred shape of a ring 6, tightly encircles the neck or cervical portion of the tooth 12. In using the said appliance, the dental practitioner selects a ring 6 of a diameter to snugly encircle the outer end of the tooth 8 which has been prepared for the taking of an impression, slips the appliance 6 over the tooth 8 and tucks the appliance 6 between the gum 10 and the neck 12 of the tooth 8 with the usual dental tools. Because of the resilient composition of the said appliance 6, the device will snugly enclose the outer end of the tooth 8 but is readily tucked into gum retracting position encircling the neck portion 12 of the tooth 8, between the tooth 8 and the gum 10 because of the resilient nature of the ring. The dentists may dip the said gum retracting appliance in a hemostatic or vaso-constrictive solution of his preference prior to placing on the tooth, may further apply a vaso-constrictive to the ring after it has been placed between the gum 10 and the cervical portion of the tooth 8, or may use said ring 6 incorporating a vaso-constrictive component impregnated in manufacture.

FIGURE 2 further illustrates gum retracting dental appliances 6 in use on teeth of different sizes and shapes.

As can best be seen from FIGURES 3 and 4, the gum retracting means in the shape of a ring 6 encircling the prepared tooth 8 retracts the gum 10 away from the cervical portion 12 of the tooth 8. In the recommended usage of the retraction ring or appliance 6, the said retraction ring 6 is placed in a position of gum retraction between the cervical portion 12 of the prepared tooth 8 and the gum 10 for a suggested period of three minutes. This period of time permits the vaso-constrictive element of the device 6 to control the capillary bleeding and permits the retracted gum 10 to develop a temporary set in its new position apart from the tooth 8. The ring 6 is then removed, and while the gum 10 is still temporarily retracted a thin impression material is injected into the crevice 7 between the gum 10 and the cervical portion 12 of the tooth 8. This process is followed by application of thick impression material to the prepared tooth or teeth.

FIGURE 5 illustrates a cast of the tooth 8 of FIGURE 4 obtainable by use of the present invention. As can be seen, the crevice 7 between the gum 10 and the neck of the tooth 12 is clearly shown and the uniformity of gun retraction apparent. From the accurate impression of the tooth 8 shown, crowns and/or bridgework may be constructed.

As can be anticipated from FIGURES 1 through 4, the ring 6 is readily usable as a means of control of capillary bleeding when a direct crown is to be applied to the tooth 8 and no impression is required.

It is apparent from the figures that the use of the ring 6 will enable the dental practitioner to secure an accurate impression of the cervical portion 12 of the tooth 8 as well as the normally exposed tooth and gum surfaces.

In accordance with the patent statutes I have described the principles of construction and operation of my improvement in gum retracting dental appliances, and while I have endeavored to set forth the best embodiment thereof, I desire to have it understood that changes may be made within the scope of the following claim without departing from the spirit of my invention.

I claim:

The method of preparing an accurate impression of a tooth, the method employing a ring of absorbent, somewhat resilient material impregnated with a vaso-constrictive material for controlling the capillary bleeding, the method consisting in separating the gum from the tooth, inserting the ring of absorbent material between the gum and the cervical portion of the tooth, retaining the ring in position until the capillary bleeding is retarded, removing the ring and leaving a channel between the gum and the tooth, and applying impression material over the tooth and into the said channel.

References Cited by the Examiner

UNITED STATES PATENTS

| 2,152,391 | 3/1939 | Spahn | 32—34 |
| 2,274,814 | 3/1942 | West | 32—34 |

OTHER REFERENCES

Orthodontists Supply Co. Advt. in Dental Survey, May 1937.

DELBERT B. LOWE, *Primary Examiner.*

ROBERT E. MORGAN, RICHARD A. GAUDET,
*Examiners.*